Nov. 1, 1955  G. C. SHINN ET AL  2,722,433
CONVERTIBLE TRAILER HAVING GOOSE-NECK MEANS
Filed June 5, 1953  5 Sheets-Sheet 1
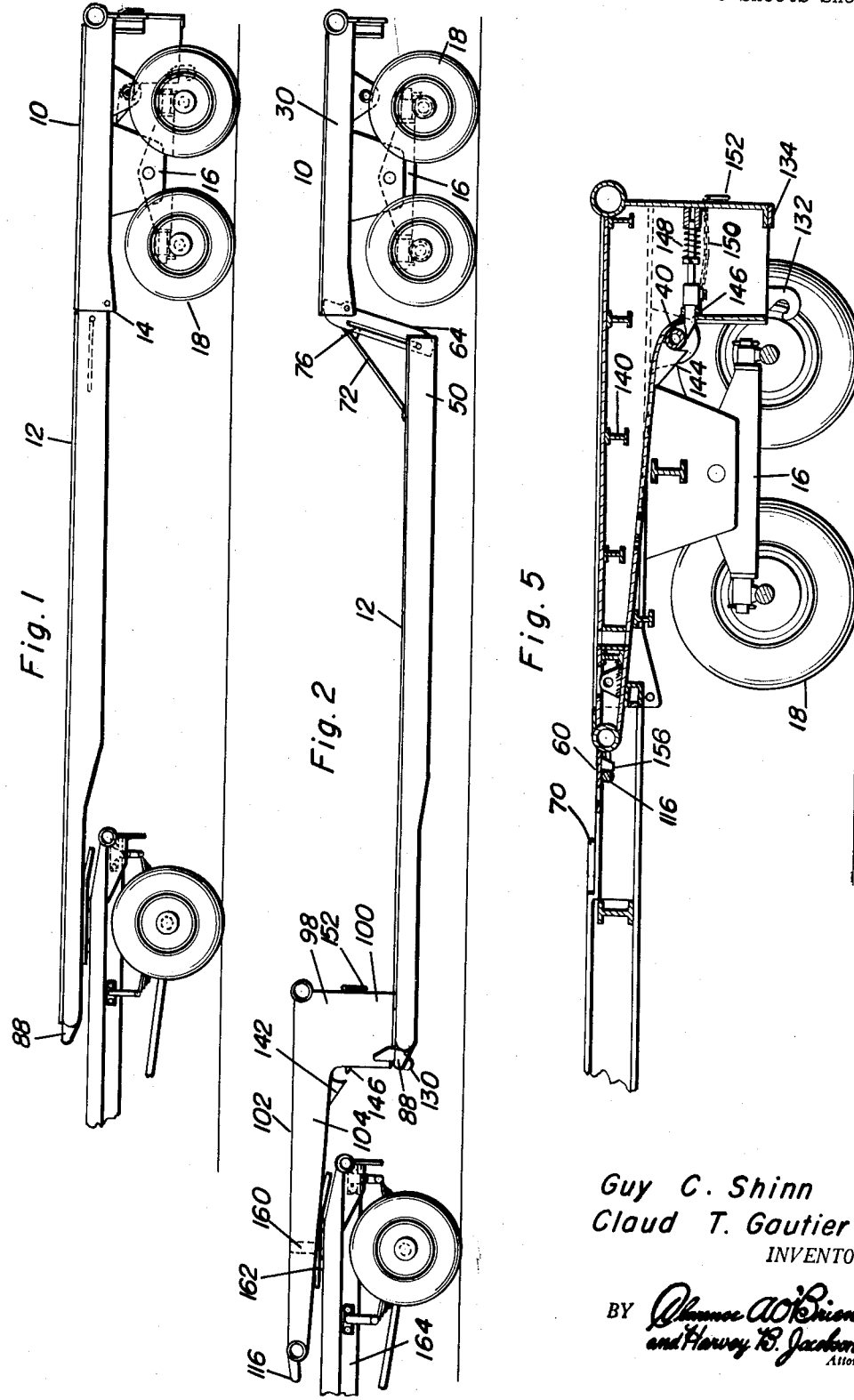
Guy C. Shinn
Claud T. Gautier
INVENTORS Nov. 1, 1955   G. C. SHINN ET AL   2,722,433
CONVERTIBLE TRAILER HAVING GOOSE-NECK MEANS
Filed June 5, 1953                                              5 Sheets-Sheet 2
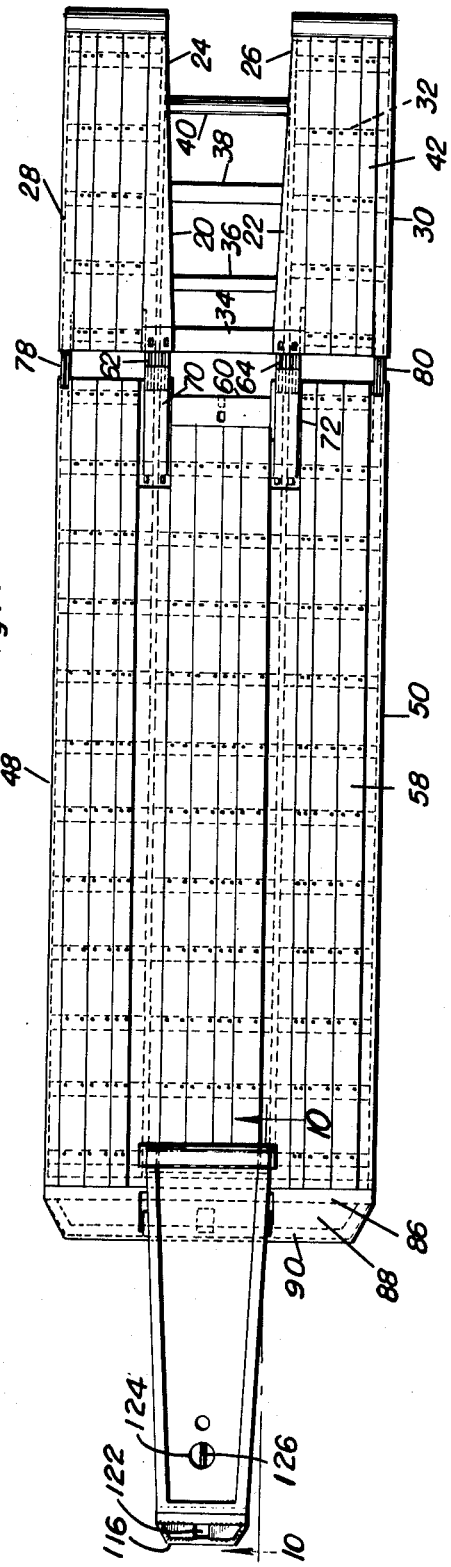
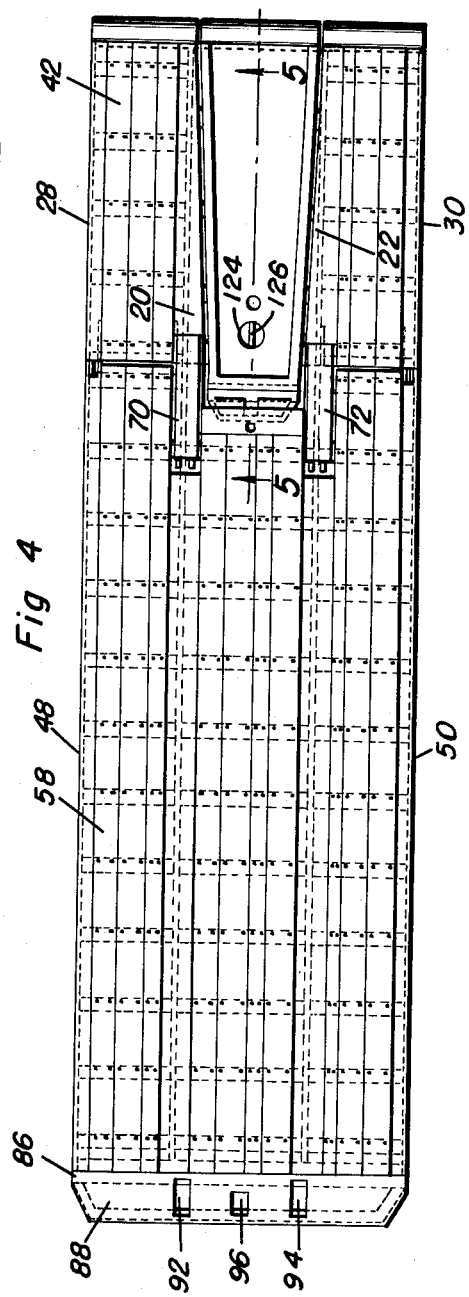
Guy C. Shinn
Claud T. Gautier
INVENTORS Nov. 1, 1955

G. C. SHINN ET AL 2,722,433

CONVERTIBLE TRAILER HAVING GOOSE-NECK MEANS

Filed June 5, 1953

Guy C. Shinn
Claud T. Gautier
INVENTORS

BY *Clarence A. O'Brien*
*and Harvey B. Jacobson*
Attorneys

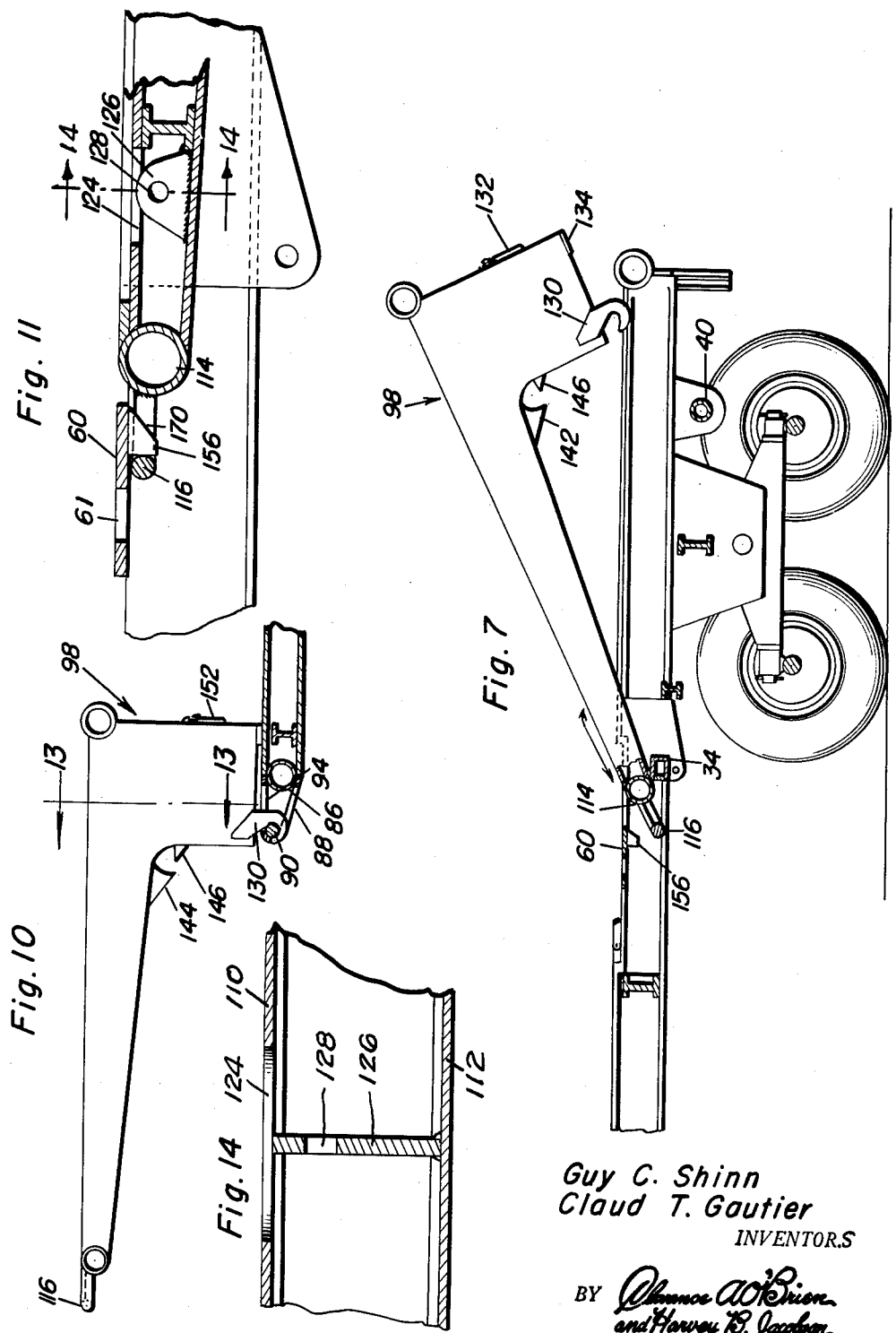

Nov. 1, 1955　　　G. C. SHINN ET AL　　　2,722,433
CONVERTIBLE TRAILER HAVING GOOSE-NECK MEANS
Filed June 5, 1953　　　　　　　　　　　　　　　　5 Sheets-Sheet 5
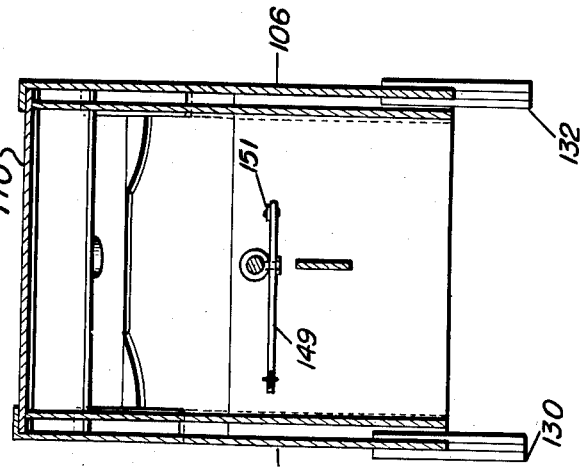
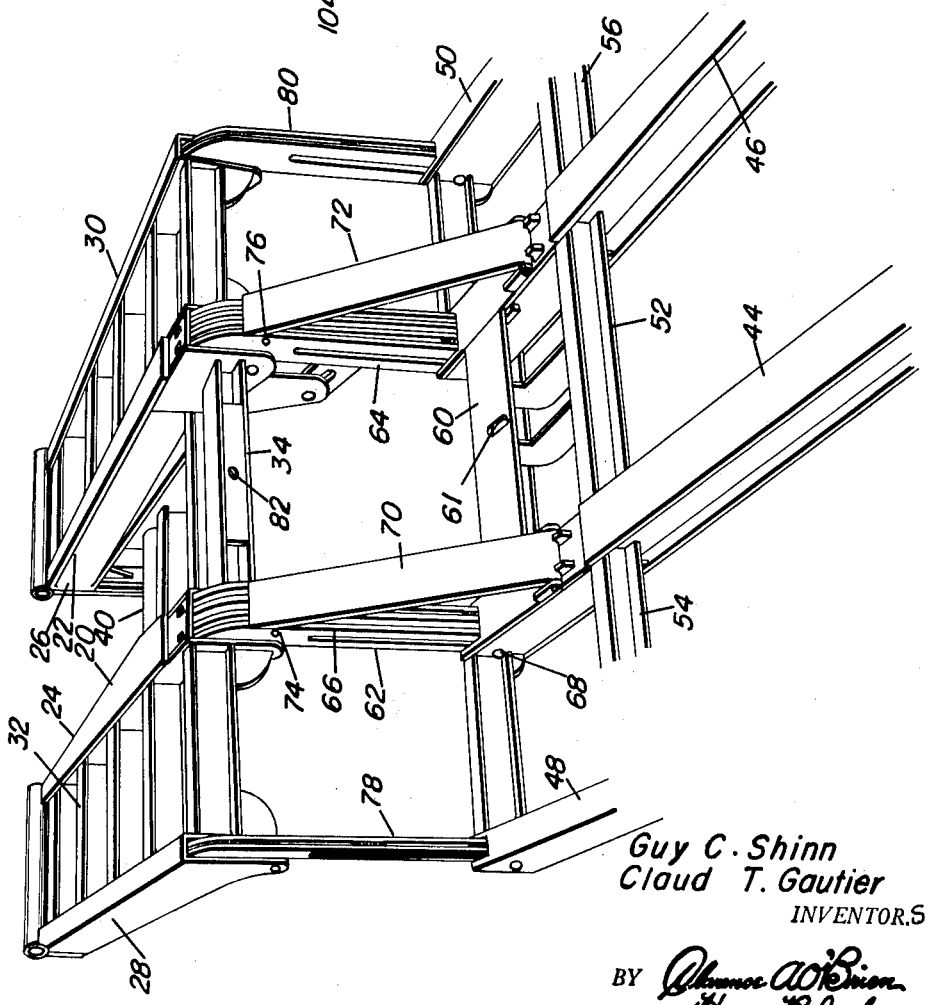
Guy C. Shinn
Claud T. Gautier
INVENTORS

United States Patent Office 2,722,433
Patented Nov. 1, 1955

2,722,433

CONVERTIBLE TRAILER HAVING GOOSE-NECK MEANS

Guy C. Shinn and Claud T. Gautier, Hamilton, Tex.

Application June 5, 1953, Serial No. 359,922

5 Claims. (Cl. 280—415)

This invention relates to a trailer truck having a goose-neck storage means and particularly to an articulated trailer truck having a forward section adapted to be fixed in various level relations with respect to the rear of the truck and a goose-neck for supporting the forward section when operated at a low level with respect to the rear of the truck and a recess in the rear section of the trailer to receive the goose-neck when the forward section of the trailer body is arranged to provide a substantially flat bed trailer.

It has heretofore been proposed to provide a convertible trailer having a rear body section mounted on suitable trucks or ground supporting wheels and a forward section articulated with respect to the rear section so that it may be fixed in a pair of levels with respect to the rear section. When the forward section of the truck is supported and operated in a low level with respect to the rear section of a trailer, it is necessary to provide a goose-neck hitch attachment for connecting the forward end of the body to the necessary tractor device. However, when the forward section of the trailer body is raised and fixed in a substantially flat bed relation, the forward end of the trailer body will be connected to the fifth wheel of the tractor machine so that the goose-neck will not be in operation. Heretofore, it has been necessary to provide an auxiliary truck to carry the goose-neck when the convertible trailer was being utilized as a flat bed trailer. The necessity of transporting the goose-neck separately from the convertible trailer has been of considerable inconvenience. The present invention provides a recess in the rear section of the trailer adapted to receive the goose-neck and secure the same in fixed relation therein so that when the goose-neck is in position, it forms a portion of the floor of the flat bed trailer. Further, the goose-neck is extended beyond the articulation of the front and rear sections of the trailer body and attached to the front section so that the goose-neck provides an auxiliary connection between the front and rear body sections of the trailer to provide an additional security means thereto.

The forward end of the front section of the trailer body is provided with recesses for engagement with lugs on an attaching portion of the goose-neck and the goose-neck proper is tapering in a forward direction, both vertically and horizontally so that the forward end of the goose-neck is relatively narrow and of less depth than the rear end of the goose-neck. Further, the forward end of the goose-neck is provided with a bridle or hitch member so that the goose-neck may readily be handled by means of a usual crane. The rear section of the trailer body is provided with a longitudinally extending recess having the transverse members of the rear section arranged to provide bottom supports for the goose-neck when it is mounted therein and at least one of the support members is arranged to be engaged by a portion of the goose-neck to position the goose-neck with respect to the rear of the trailer and also is provided with a manually operable latch so that the goose-neck may be readily attached to the rear section of the trailer. Further, the forward end of the goose-neck extends forward past the articulation between the rear and front sections of the trailer body and the front section of the trailer body is provided with a depending lug adapted to engage the bridle on the front end of the goose-neck so that the flat bed trailer will be locked to the goose-neck by both the front and rear sections thereof.

It is accordingly the object of the invention to provide an improved articulated trailer.

A further object of the invention is to provide an improved goose-neck for an articulated trailer.

A still further object of the invention is to provide an articulated trailer with a means for carrying a goose-neck.

Another object of the invention is to provide a goose-neck connection for attaching the front and rear sections of a convertible trailer in flat bed relation.

Other objects and many of the attendant advantages of the present invention will be apparent from the following detailed description taken in conjunction with the accompanying drawings and in which:

Figure 1 is a side elevational view of the convertible trailer in use as a flat bed trailer with the goose-neck incorporated in the body;

Figure 2 is a side elevational view of the trailer in use as a low-boy trailer with a goose-neck in carrying position;

Figure 3 is a top plan view of the low-boy trailer with the goose-neck in position;

Figure 4 is a top plan view of the flat bed trailer with the goose-neck incorporated into the body of the trailer;

Figure 5 is a vertical elevation through the goose-neck incorporated in the flat bed trailer and taken substantially on the plane indicated by the line 5—5 of Figure 4;

Figure 7 is a vertical sectional view through the rear of the trailer with the goose-neck in intermediate position;

Figure 10 is an enlarged sectional view showing the goose-neck in operative position and taken substantially on the plane indicated by the line 10—10 of Figure 3;

Figure 11 is an enlarged sectional view showing the fastening between the goose-neck and the forward section of the trailer body;

Figure 13 is a cross-sectional view of the goose-neck in operative position and taken substantially on the plane indicated by the line 13—13 of Figure 10;

Figure 14 is an enlarged sectional view of the hoist line hitch of the goose-neck taken substantially on the plane indicated by the line 14—14 of Figure 11; and Figure 15 is a perspective view of the rear section of the trailer frame showing the arrangement of the recess for receiving the goose-neck therein.

Figure 8:
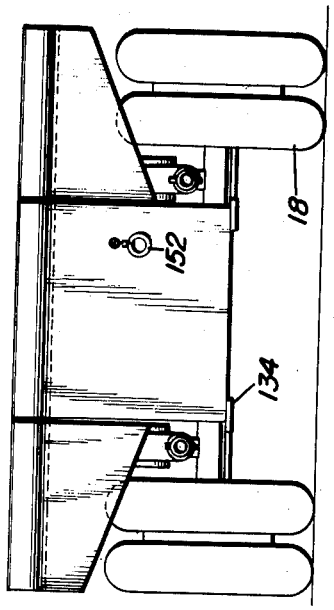
Figure 8 is a rear elevation of the trailer with the goose-neck incorporated in the body.
Figure 9:
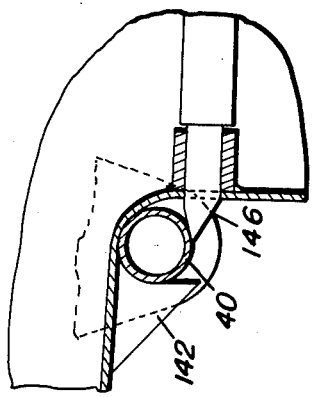
Figure 9 is an enlarged sectional elevation showing the fastening of the goose-neck to the rear section of the trailer.

The convertible trailer is substantially of the type indicated in applicant's copending application, Serial Number 286,075 filed May 5, 1952, now Patent No. 2,663,573, and having a rear portion 10 and a forward portion 12, with an articulation 14 between the front and rear sections. The rear section 10 is provided with a plurality of trucks 16, having ground engaging wheels 18. The rear section of the trailer body is as is usual, constituted by a pair of longitudinally extending beams 20 and 22, preferably of the H-beam type and are herein shown as having the webs of the beams cut away at 24 and 26 to provide a substantially tapered space between the beams 20 and 22. Side members 28 and 30, preferably of channel-formation, are arranged externally of the center beams 20 and 22 and transverse members 32 extend between the central beams 20 and 28 and the central beam 22 and the side member 30. A plurality of transverse members 34, 36, 38, and 40 extend between the beams 20 and 24 and are vertically spaced with relation to the top of the beams 20 and 24, so that they provide forwardly tapered channel between the beams 20 and 22. Flooring members 42 are placed on the transverse members 32 between the central beam members and the external or side channel members are preferably substantially placed therewith to provide a smooth floor in the rear portion of the trailer body. The forward portion of the trailer bed is provided with a front body portion having longitudinally extending H-beam members 44 and 46 and side channel members 48 and 50. The beams 44 and 46 are joined by a plurality of transverse members 52 and the members 44 and 48 are joined by transverse members 54 and the members 46 and 50 are joined by transverse members 56. Flooring planks 58 may be mounted on the transverse members to provide a substantially smooth floor in the forward section of the trailer body. The rear section of the beams 44 and 46 are connected by means of a plate 60 having an aperture 61 therein for receiving a cable for controlling the position of the front and rear portions during the change of the level therein. Articulation members 62 and 64 extend between the beams 20 and 44 and 22 and 46 respectively. The articulation members 62 and 64 are provided with longitudinal slots 66 to engage with hinge pins 68 so that the beams 44 and 46 may be telescoped with relation to the hinge member 62 and 64 and locking members 70 and 72 are hingedly mounted on the tops of the beams 44 and 46 and engage in locking relation with transverse locking pins 74 extending across the articulation members 62 and 64. Side channels 28 and 48 are provided with articulation members 78 while the side channel members 30 and 50 are provided with the articulation members 80. Obviously, if desired, the locking brace members 70 and 72 could likewise be supplied for the articulation members 78 and 80. The forward transverse member 34, of the rear section 10, is preferably provided with an eye 82 for connection of the lifting cable for controlling the articulation.

The forward end of the body section 12 is provided with a front bolster member 86 which is preferably tubular in cross-section and is set into the flanges of the beams 44 and 46 and the channel members 48 and 50. A substantially U-shaped plate 88 is welded on to the bolster member 86 and extends forwardly therefrom and has arranged in a bight thereof a substantially rod-like member 90. A pair of apertures 92 and 94 are provided in the plate 88 substantially in continuation or alignment with the members 44 and 46 for a purpose presently to be described. An aperture 96 is provided in the plate 88 for the attachment of a crane hook or other means for lifting the flat bed or a low bed trailer into operative position.

A goose-neck indicated generally at 98 is provided for attachment to the forward end of the body member 12 and is constituted by a substantially rectangular connecting member 100 and a forward projecting or goose-neck member 102. Goose-neck 98 is constituted by means of a pair of side plates 104 and 106 which are substantially channel-shaped members having the rectangular portions depending from tapered portions with inturned flanges therealong. The rear portion 108 is welded between the flanges of the depending portions and the top portion 110 is welded between the top flanges of the sides 104 and 106 and preferably a bottom portion 112 extends at least partially along the tapered portion between the bottom of the members 104 and 106. A substantially tubular bolster member 114 extends across the forward end of the members 104 and 106 and is connected thereto by any suitable means and preferably is also rigidly connected to the plates 110 and 112. A bridle member 116 extends forwardly from the bolster 114 and is connected thereto by means of plates 118 and 120 providing an aperture 122 for the connection of a suitable cable hook to lift the forward end of the goose-neck. Further, the plate 110 is provided with an aperture 124 which exposes the lug 126 which is provided with an aperture 128 for the connection of a cable hook or other fastener for control of the goose-neck during certain of the operations. Attaching lugs 130 and 132 are provided on the side members 104 and 106 and extend downwardly from the connecting portion thereof to extend through the apertures 92 and 94 to connect to the bridle member 90. A foot member 134 is provided across the rear of the connecting member 100 for providing a pressure point between the goose-neck and the forward portion 12 of the trailer. The side members 104 and 106 are spaced by suitable reinforcing members 140 wherein shown as H-type beams, although any type of support might be utilized.

Depending lugs 142 and 144 are provided on the members 106 and 104 and extend downwardly in spaced relation to the forward portion of the connecting or base portion 100 of the goose-neck.

One of the transverse supporting members such as the supporting member 40, is preferably of tubular formation and the lugs 142 and 144 engage the member 40 to position the goose-neck with respect to the rear portion of the trailer when the goose-neck is positioned in the aperture in the back portion thereof. A connecting member is also provided with a slidable latch rod 146 pressed by a spring 148 and controlled by means of a suitable tension memebr, such as the chain 150. The chain 150 may be provided with a handle 152 for allowing ready operation of the latch bar 146.

The transverse plate 60 is positioned forwardly of the articulation between the sections 10 and 12 and is provided with a lug 156 for cooperation with the bridle 116 of the goose-neck when the goose-neck is in position.

Preferably the tractor for the convertible trailer is provided with a suitable winch and crane for operation of the various portions thereof. When the device is being operated as a low bed trailer, the goose-neck is lowered into position in the forward end of the section 12 with the bridle portion 116 adjacent to the ground so that the lugs 130 and 132 may pass through the apertures 92 and 94 after which the forward end of the goose-neck is lifted up to bring the pressure foot 134 into contact with the top of the body portion 12 after which the forward portion of the convertible trailer may be lifted up by any suitable crane so that the goose-neck 98 may be engaged with the king pin 160 of the fifth wheel 162 mounted on the tractor 164. In this position, the tractor will operate the device as a low bed trailer whereby suitable devices such as drag lines, shovels, or the like, may be readily carried thereon.

Figure 6:
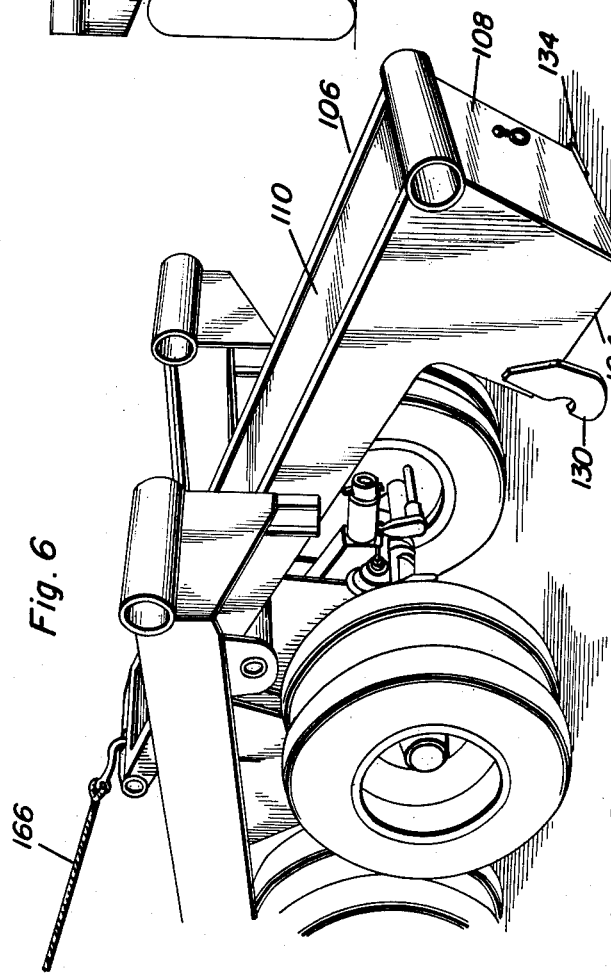
Figure 6 is a perspective view of the rear of the trailer with the goose-neck in readiness to be placed in the body.
Figure 12:
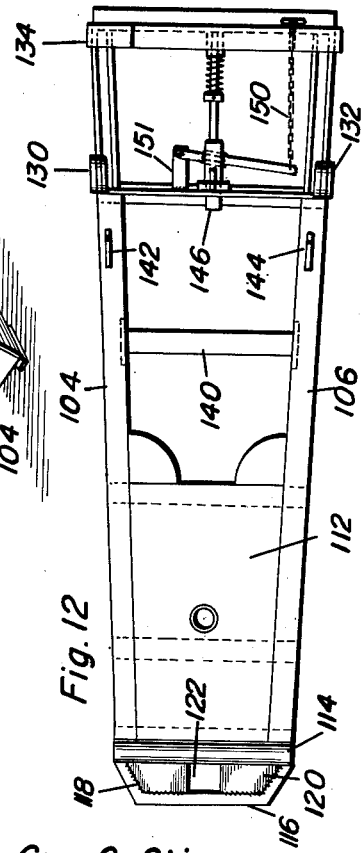
Figure 12 is a bottom plan view of the goose-neck.

When it is desired to utilize the device as a high bed trailer, as shown in Figure 1, the goose-neck is lifted out of position by means of a suitable crane and deposited in the position as shown in Figure 6. A cable 166 is then connected into the bridle 116 and the device pulled forward into the recess by means of a suitable winch located on the tractor vehicle 164. As soon as the goose-neck is in supporting relation in the recess in the rear section of the trailer body, the line 166 is connected into the eye 128 which is reachable through the aperture 124 is the plate 110. After the goose-neck is moved forward, the bridle 116 will contact the sloping surface 170 on the lug 156 and because of the connection to the eye 128, the bridle will be depressed, as shown in Figure 7, so that the bridle will pass below the lug 156 after which release of the pressure on the line 166 will allow the goose-neck to settle in position as shown in Figure 8 with the top thereof substantially flush with the rear portion of the body 10. The lugs 142 and 144 will then engage the support member 40 so that the rear end of the goose-neck will be substantially flush with the rear end of the body portion 10 and the top thereof will be substantially flush with the planking 42 so that the entire structure will provide a substantially flat unbroken bed.

The latch member 146 will be engaged with the support 40 so that the goose-neck cannot be lifted or jolted upwardly from its position on the support members and the bridle 116 will be in firm engagement with the lug 156 to prevent uncoupling of the sections 10 and 12 and to prevent upward movement of the forward end of the goose-neck.

It will thus be seen that the present invention provides a carriage for the goose-neck so that the goose-neck will constantly be with the trailer and may be readily lifted out by the suitable crane or winch carried on the tractor vehicle for the convertible trailer. Not only will the goose-neck 98 be in position when needed but it will release an auxiliary truck which will no longer be needed to transport the goose-neck when the convertible trailer is being used as a flat bed trailer.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. In a convertible trailer having a rear body portion mounted on ground engaging wheels, a front portion adapted to be selectively articulated with respect to the rear portion for operation at different levels and a disconnectible goose-neck hitch member for said trailer connected at the front of said front portion when said front body portion is operated at a lower level than said rear body portion, a carrier for said disconnected goose-neck when said body portions are operated as a flat bed trailer comprising a longitudinal recess in said rear body portion adapted to receive said goose-neck, transverse support members in said recess.

2. In a convertible trailer having a rear body portion mounted on ground engaging wheels, a front portion adapted to be selectively articulated with respect to the rear portion for operation at different levels and a disconnectible goose-neck hitch member for said trailer connected at the front of said front portion when said front body portion is operated at a lower level than said rear body portion, a carrier for said disconnected goose-neck when said body portions are operated as a flat bed trailer comprising a longitudinal recess in said rear body portion adapted to receive said goose-neck, transverse support members in said recess, a depending lug on said goose-neck adapted to engage one of said support members and a longitudinally movable latch member engageable with one of said support members.

3. In a convertible trailer having a rear body section supported on ground engaging wheels, a front section, articulating means joining said rear and front sections for operation of said front section at different levels with respect to said rear section, a disconnectible goose-neck adapted for operative attachment at the front end of said front section to support the forward end of the front section at a lower level than said rear section, said goose-neck tapering from rear to front, a substantially rectangular attaching member at the rear end of the goose-neck, a bridle extending from the front of the goose-neck, a forwardly tapered recess substantially centrally of said rear section adapted to carry said disconnected goose-neck, said goose-neck being of greater length than said rear section, transverse support members in said recess, said support members being positioned to support the top of said goose-neck substantially flush with the top of said rear section, a depending lug spaced from said goose-neck in spaced relation to said attaching member, said lug engaging one of said support members to position the rear of said goose-neck substantially flush with the rear of said rear section.

4. In a convertible trailer having a rear body section supported on ground engaging wheels, a front section, articulating means joining said rear and front sections for operation of said front section at different levels with respect to said rear section, a disconnectible goose-neck adapted for operative attachment adjacent the front end of said front section to support the forward end of the front section at a lower level than said rear section, said goose-neck tapering from rear to front, a substantially rectangular attaching member at the rear end of the goose-neck, a bridle extending from the front of the goose-neck, a forwardly tapered recess substantially centrally of said rear section adapted to carry said disconnected goose-neck, said goose-neck being of greater length than said rear section, transverse support members in said recess, said support members being positioned to support the top of said goose-neck substantially flush with the top of said rear section, a depending lug spaced from said goose-neck in spaced relation to said attaching member, said lug engaging one of said support members to position the rear of said goose-neck substantially flush with the rear of said rear section, a latch operable to secure said goose-neck in said recess.

5. In a convertible trailer having a rear body section supported on ground engaging wheels, a front section, articulating means joining said rear and front sections for operation of said front section at different levels with respect to said rear section, a disconnectible goose-neck adapted for operative attachment adjacent the front end of said front section to support the forward end of the front section at a lower level than said rear section, said goose-neck tapering from rear to front, a substantially rectangular attaching member at the rear end of the goose-neck, a bridle extending from the front of the goose-neck, a forwardly tapered recess substantially centrally of said rear section adapted to carry said disconnected goose-neck, said goose-neck being of greater length than said rear section, transverse support members in said recess, said support members being positioned to support the top of said goose-neck substantially flush with the top of said rear section, a depending lug spaced from said goose-neck in spaced relation to said attaching member, said lug engaging one of said support members to position the rear of said goose-neck substantially flush with the rear of said rear section, a portion of said goose-neck extending forwardly of said articulation and a lug fixed to said forward section for engagement with the bridle on said goose-neck.

References Cited in the file of this patent

UNITED STATES PATENTS

| | | |
|---|---|---|
| 2,393,016 | Black | Jan. 15, 1946 |
| 2,474,231 | Crosley | June 28, 1949 |
| 2,513,258 | Ulrich | June 27, 1950 |
| 2,663,573 | Shinn | Dec. 22, 1953 |